(12) United States Patent
Wezelenburg et al.

(10) Patent No.: US 7,689,735 B2
(45) Date of Patent: Mar. 30, 2010

(54) INSTRUCTION STREAM CONTROL

(75) Inventors: Martinus Cornelis Wezelenburg, Leuven (BE); Dirk Duerinckx, Wilsele (BE); Jan Guffens, Linden-Lubbeek (BE)

(73) Assignee: ARM Limited (GB)

( * ) Notice: Subject to any disclaimer, the term of this patent is extended or adjusted under 35 U.S.C. 154(b) by 941 days.

(21) Appl. No.: 11/240,637

(22) Filed: Oct. 3, 2005

(65) Prior Publication Data

US 2007/0079110 A1 Apr. 5, 2007

(51) Int. Cl.
*G06F 3/00* (2006.01)
*G06F 5/00* (2006.01)
*G06F 9/45* (2006.01)

(52) U.S. Cl. ..................... 710/29; 710/52; 710/110; 717/150

(58) Field of Classification Search .................. 712/205; 710/52, 29, 110; 717/150
See application file for complete search history.

(56) References Cited

U.S. PATENT DOCUMENTS

| | | | | | |
|---|---|---|---|---|---|
| 4,325,118 | A | * | 4/1982 | DeVita et al. | 712/210 |
| 4,482,950 | A | * | 11/1984 | Dshkhunian et al. | 712/32 |
| 5,274,647 | A | * | 12/1993 | Tanaka | 714/799 |
| 5,680,600 | A | * | 10/1997 | Childers et al. | 712/245 |
| 6,574,273 | B1 | * | 6/2003 | Luna et al. | 375/240 |
| 6,950,929 | B2 | * | 9/2005 | Chung et al. | 712/241 |
| 2003/0221032 | A1 | * | 11/2003 | Gwilt et al. | 710/110 |
| 2004/0019886 | A1 | * | 1/2004 | Berent et al. | 717/158 |
| 2005/0138328 | A1 | * | 6/2005 | Moy et al. | 712/205 |
| 2005/0193184 | A1 | * | 9/2005 | Kohno et al. | 712/1 |

OTHER PUBLICATIONS

IBM Technical Disclosure Bulletin, Feb. 1, 1983, vol. 25, Issue 9, pp. 4722-4727, NN83024722.*

* cited by examiner

*Primary Examiner*—Niketa I Patel
*Assistant Examiner*—Farley J Abad
(74) *Attorney, Agent, or Firm*—Nixon & Vanderhye P.C.

(57) ABSTRACT

An interface requests instructions from a data store storing instructions of an application to be processed by a data processor, and receives and transmits the instructions to the data processor. The interface includes: an input that receives the instructions from the data store via at least one input bus; a buffer that stores received instructions; an output that outputs instructions to the data processing apparatus via the output bus; a control signal input that receives a control signal; and a buffer controller that controls the buffer to request an instruction subsequent to a previously received instruction within an instruction stream of the application from the data store in response to detection of no control signal on the control signal input and to detection of available buffer storage capacity. In response to a control signal received at the control signal input, the controller controls at least one of input and storage of instructions within the interface in order to seek to reduce instruction movement through the input.

18 Claims, 6 Drawing Sheets

INSTRUCTION STREAM CONTROL

TECHNICAL FIELD

This invention relates to the field of data processing systems. More particularly, this invention relates to the field of feeding program instructions to a processor for execution.

BACKGROUND

The problem of accessing instructions that are stored in a data store such as a memory and providing them to a data processor is a problem that has been addressed in a variety of ways. Access to memory can be expensive, as measured by a variety of metrics. Dedicated local memory is fast, can provide a high bandwidth, is power efficient and readily available, but is costly in area. By contrast, on-die shared and/or arbitrated memory consumes more power and may not always be available or satisfy peak bandwidth requirements, but the cost of implementation is reduced. Off-chip memory is the cheapest, but suffers the largest penalty in power consumption, access latency and available bandwidth. Any limitation in memory access performance either due to latency or bandwidth limitations inflicts also a penalty in the processor efficiency, as it will stall when the required instruction is not available. All three issues regarding shared memory access: latency, bandwidth and power consumption can be mitigated by providing an intermediate data store. In some systems, a program instruction cache is provided such that the instructions can be accessed from within the cache. This provides fast access of the instructions, but has the disadvantage of being a reactive mechanism, which makes autonomous decisions on which instruction to store are based solely on the history of the instructions or instruction addresses being requested by the processor. To mitigate this disadvantage, caches are often equipped with complex prediction logic with the goal to maximise the probability of keeping the requested instructions in its local store, as a consequence such devices have high power consumption, thus caches are very power hungry. This can be a particular disadvantage where the program is long and many instructions are stored.

An alternative is to buffer the instructions prior to use in a FIFO buffer. This is cheaper than a cache but has less flexibility. This lack of flexibility means that instructions have to be moved more often which costs power and can also lead to stalling in the processor where an instruction is not available at the appropriate time.

Many of the above solutions are specific to particular architectures and thus, new solutions need to be designed for new systems.

SUMMARY OF THE INVENTION

According to a first aspect, the present invention provides an interface operable to request instructions from a data store, said data store storing instructions of an application to be processed by a data processor, and operable to receive and transmit said instructions to said data processor, said interface comprising: an input operable to receive said instructions from said data store via at least one input bus; a buffer operable to store said received instructions; an output operable to output said instructions to said data processing apparatus via at least one output bus; a control signal input operable to receive a control signal; and a buffer controller operable to control said buffer to request an instruction subsequent to a previously received instruction within an instruction stream of said application from said data store in response to detection of no control signal on said control signal input and to detection of available buffer storage capacity; and in response to a control signal received at said control signal input, said controller is operable to control at least one of input and storage of instructions with said interface in order to seek to reduce instruction movement through said input.

The provision of an interface controlled by control signals, between a data store and a data processor allows the two entities to be connected and operate efficiently without the need to alter the design of one to fit the architecture of the other. In particular, the use of a simple buffer provides data storage with low power consumption but which is nevertheless controllable. Having a buffer controller which automatically requests a subsequent instruction if no other control signal is present and if the buffer is not full provides an aggressive pre-fetch policy which enables the buffer to remain full most of the time and helps to reduce the number of stalls that might occur due to an instruction not being ready. This can be of particular importance in high throughput signal processing applications, which are typically relatively branch free. Furthermore, provision of a control signal input which overrides the controller provides additional control to the buffer and can enable instruction movement through the interface to be reduced by controlling the fetching and storage of instructions in an intelligent way.

In some embodiments, said interface further comprises a configuration signal input operable to receive a configuration signal, said buffer controller being operable to control said at least one of input and storage of instructions within said interface in response to both said control signal received at said control signal input and to a configuration signal received at said configuration interface.

The provision of a configuration signal input allows input of bounds of conditions defined by a configuration signal. This means that the autonomous local system can be provided with global system information such that total system performance can be improved. For example, the pre-fetch aggressiveness may be increased for a specific program while decreased for another, not depending on the program itself, but on the system conditions under which the program interacts with the system. This is of course unknown to the program, as it is a session property, but this information can be input in the form of the configuration signal.

In some embodiments, said data store is operable to store control information associated with at least some of said instructions, and said interface is operable to receive, store and output said associated information along with said at least some instructions.

The provision of the control information embedded within the instructions means that this control information travels with the instructions of the application and thus an application can run without a need to pre-load any desired control information into a portion of the data processor. The control information can be used by the data processor to produce the control signals for controlling the buffer.

In some embodiments said input is operable to receive instructions from one input bus and said output is operable to output instructions to a plurality of output buses.

The interface is highly adaptable and can receive data from a number of different input buses and output it to a number of different output buses. In some embodiments, it is input from a single input bus and output to a plurality of output buses. The number of output buses reflects the amount of data that can be sent to the data processor in a single cycle, and thus, needs to be high to avoid the processor stalling too often. The number of input buses can be smaller than the number of output buses as they need to reflect the average bandwidth requirements of the processor as opposed to the maximum or near maximum requirements, that should be reflected by the output buses.

In some embodiments, said interface further comprises: input logic operable to control which of said at least one input buses said input receives said instructions from; and output logic operable to control which of said at least one output buses said output outputs said instructions to.

Input and output logic enable control of the buses that data is sent to and received from and therefore add to the flexibility of the interface.

Embodiments of the invention are particularly appropriate to very long instruction words that are in compacted form, such that not all of said instructions have the same length. Instructions of different lengths are supported by the activation of the required number of output buses to transmit them to the data processor.

In some embodiments the speed of the input and output clocks is set at the design stage whereas in others said interface further comprises: input logic operable to configure a clock speed for clocking receipt of said instructions; and output logic operable to configure a clock speed for clocking output of said instructions.

Although in some embodiments it may be appropriate to use buses of equal widths as instructions may be an integer multiple of a default word size, in other embodiments at least one of said at least one input bus and said at least one output bus is of a different width to at least one other of said at least one input bus and said at least one output bus.

The ability of the interface to receive and send information via different numbers of buses and buses of different widths enables it to receive an instruction stored in a single memory or several memory banks and to output the instruction just by using the input and output logic to control the buses. Furthermore, having different numbers of input and output buses means that input and output bandwidths can be different. It may be advantageous to have a high output bandwidth, while a lower input bandwidth is acceptable.

In some embodiments said input logic is operable to configure said clock speed for clocking receipt of said instructions at a first rate and said output logic is operable to configure said clock speed for clocking output of said instructions at a second rate, said first rate being different to said second rate.

In some embodiments, the interface can be configured to receive instructions at a different speed to which it outputs them. Thus, perhaps instructions are received from a single bus at a fast rate and are output on multiple buses at a lower rate. This may suit some architectures where the data store has a certain width and the data processor has a wider width. Clearly, the ability of the interface to be configured in a variety of different ways allows different architectures to be connected by this interface.

In some embodiments, said input is operable to receive instructions across a bandwidth that is smaller than a bandwidth that said output is operable to output instructions across.

A high output bandwidth is important as it reduces the likelihood of the processor stalling. However, it may be that a high output bandwidth can be achieved with a lower input bandwidth. This can occur, if, for example, instructions that are to be used a multiple number of times by the processor are stored in the interface, thus, they are output a multiple number of times as required by the processor but input only once, or just a few times. A further advantage of such a system arises where instructions are compacted VLIWs. In such a case an input bandwidth operable to input a compacted instruction in one cycle is probably sufficient most of the time. Where a wider instruction is required it can be input in two cycles, a higher output bandwidth means it can be output in a single cycle and the processor does not stall.

In some embodiments, in response to said control signal indicating request of an instruction at an address remote from a previously requested address, said controller is operable to request instructions subsequent to said remote instruction in order to replace instructions stored within said buffer with said remote instruction and instructions subsequent to said remote instruction.

The controller of the interface, on detection of a branch or jump, will effectively flush the buffer and insert instructions subsequent to the instruction jumped to. Thus, the aggressive pre-fetch in conjunction with a control signal indicating a branch or jump is to happen, effectively prepares the buffer to store the required future instructions.

Embodiments of the present invention can handle branches and jumps in a particularly efficient manner. In particular, in response to said control signal indicating request of a subsequent instruction that is at an address close to but not adjacent to a previously requested address, said buffer controller is operable to request a plurality of subsequent instructions from said instruction stream up to and including said instruction at said close address.

Near jumps can also be dealt with effectively by embodiments of the invention. In response to receipt of a control signal indicating a near jump, the aggressive pre-fetch behaviour of the buffer can be used to request instructions from the instruction stream up to and including the near jump. Thus, the instruction of the near jump is ready in the buffer when it is required, without the need to alter the buffers normal pre-fetch behaviour.

A second aspect of the present invention can provide a data processing apparatus comprising: a data processor for processing an application; an interface according to a first aspect of the present invention; and a controller operable to generate said control signal in response to control information and to transmit said control signal to said control signal input of said interface.

In some embodiment, said data store is operable to store control information associated with at least some of said instructions, and said interface is operable to receive, store and output said associated information along with said at least some instructions; and said controller is operable to receive said instructions and said associated control information from said interface and to generate said control signals in response to said associated control information.

The controller on the data processor can receive the associated control information that is sent with the instructions and can use it to generate control signals to control the flow of further instructions through the interface. In this way, the associated information can be used to produce control signals that reduce instruction movement, without the need for other information to be input to the system.

In some embodiments, said controller is further operable to output an address associated with an instruction to said buffer controller.

The controller that controls the aggressive pre-fetch of the buffer does so in response to the instruction addresses. It assumes that an instruction at a subsequent address to a currently fetched instruction is required unless a control signal indicates some other behaviour. The controller can send the control signal in the form of address information to the buffer controller and thus, when there is, for example, a jump the buffer controller receives an address of the destination of the buffer and can adapt its pre-fetch behaviour accordingly.

In some embodiments, said associated control information control signal identifies loops within said program, and said control signal is operable to inhibit overwriting of at least some of said instructions of said program loop stored in said buffer during execution of said loop.

The associated control information can contain a variety of information such as the identification of loops within a program, their size and the starting address, etc. The control signal can control the buffer controller to act on this information and inhibit over-writing of at least some of the instructions of the program loops stored in the buffer. This reduces program movement by ensuring that the instructions do not have to keep being re-fetched from a memory or data store but are kept in the buffer during the execution of the loop. This increases the efficiency of the behaviour of the system by reducing program instruction movement.

A third aspect of the present invention provides a method of controlling the transmission of instructions from a data store to a data processing apparatus via an interface, comprising the steps of: receiving said instructions from said data store at said interface from at least one input bus; storing said received instructions in a buffer within said interface; outputting said instructions to said data processing apparatus via at least one output bus; receiving a control signal at a control signal input and controlling at least one of input and storage of instructions within said interface in order to seek to reduce instruction movement through said interface in response to said control signal; and controlling said interface to request an instruction subsequent to a previously received instruction within an instruction stream of said application from said data store in response to detection of no control signal on said control signal input and to detection of available buffer storage capacity.

Although in some embodiments, said interface is a separate entity in other embodiments said interface is formed within said controller.

An interface formed within the controller enables signals to be passed between the two very simply, without the need for an external feedback loop. This allows for the realisation of a design with either less latency or a reduced critical path thus enabling the design to achieve higher clock speeds. Furthermore there can be some sharing of registers, thereby reducing the data storage requirements of the apparatus.

A fourth aspect of the present invention comprises a method of compiling an application for execution by a data processor comprising the steps of: generating a complete static analysis of said application; generating an instruction stream for execution by said data processor; deriving control signals from said complete static analysis, said control signals seeking to reduce instruction movement through an interface feeding instructions to said data processor.

The provision in a compiler of the ability to generate a complete static analysis of an application means that the application can be analysed and decisions on improving its performance can be made using this information. In the present case, control signals can be derived from the complete static analysis that seek to reduce instruction movement through an interface. The complete static analysis shows which instructions are used where, where they come from and where they are repeated in a loop. This information can be used to control instruction fetches and reduce instruction movement.

In some embodiments, the method comprises a further step of associating said derived control signals with at least some of said instructions within said instruction stream.

By associating the device control signals with the instructions, a system that can function in response to the instruction stream without further external input can be produced.

A fifth aspect of the present invention provides a computer program product for controlling an apparatus to perform a method according to a fourth aspect of the present invention.

DETAILED DESCRIPTION OF THE PREFERRED EMBODIMENTS

Figure 1A:
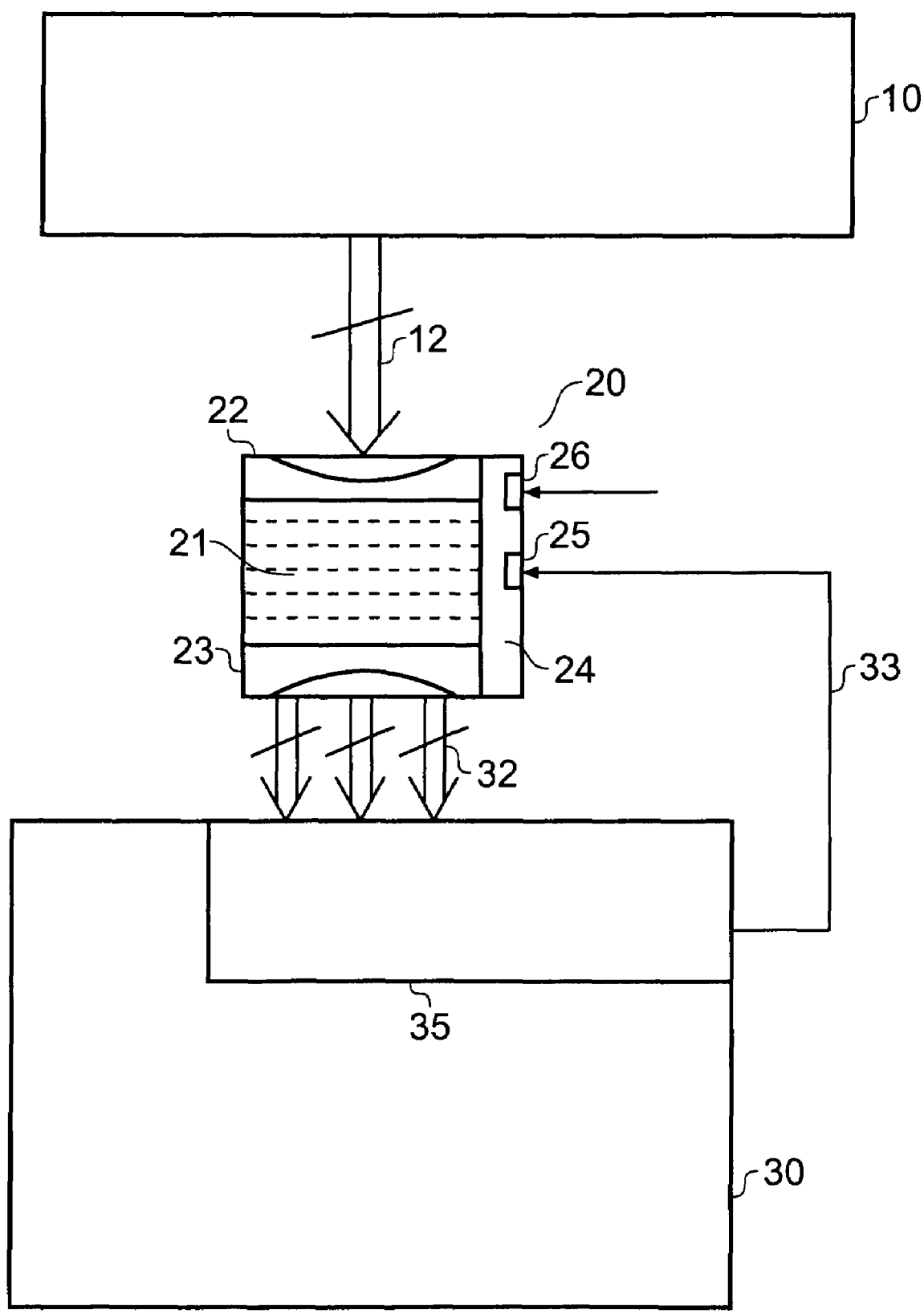
FIGS. 1A and 1B schematically illustrate an interface between an instruction memory and a processor.

FIG. 1A schematically shows a data store 10 which in this case is a memory but which could comprise, for example, a cache or a flash memory, an input bus 12, an interface 20, output buses 32 and a data processor 30. Memory 10 stores instructions of an application and associated with some of these instructions is control information. These instructions have been derived from very long instruction words (VLIWs) that have been compacted. The compaction has been to different degrees and as such some of the stored instructions have different lengths to each other. Although in this embodiment VLIWs are processed, the technology is not limited to the processing of VLIWs and in other embodiments other instructions may be processed.

Interface 20 comprises a data storage area 21, input control logic 22, output control logic 23, a controller 24, a configuration signal input 26, and a control signal input 25. The data storage area 21 is a buffer that generally operates as a stream buffer. Instructions forming an instruction stream of the application are requested from memory 10 by input logic 22 and travel through data bus 12 to the input of interface 20. Controller 24 indicates to control logic which instructions are to be requested. The instructions requested by input logic 22 are stored within the buffer 21 and exit via output buses 32 under control of output logic 23. The instructions are then received and processed by data processor 30.

Data processor 30 has a data processor controller 35 which is responsive to any control information that is associated with at least some of the received instructions. The data processor controller 35 generates control signals from this control information and outputs them via control signal line 33 to interface 20 where they are received at control signal input 25. The interface controller 24 responds to the control signals and controls the input and storage of instructions in the interface in response to the control signals. The control signals are derived from the control information associated with the instructions and they seek to reduce instruction movement within this interface and thereby increase the efficiency of the process.

The control information comprises information about the program behaviour, and in particular behaviour where a non-subsequent instruction will be needed. For example, if a jump is to be performed, the control information may indicate this, and give the jump destination address; if a loop is to be executed, its start and end instructions and the number of times it is to be repeated will be given; or if a branch is to be performed, information about the branch will be included in the control information.

During operation, buffer controller 24 controls the interface to request subsequent instructions in an instruction stream whenever it senses that there is capacity in the buffer and there is no control signal received at input 25. A control signal at input 25 generally indicates that an instruction other than a subsequent instruction will be required and the controller 24 then controls the storage and the input logic to store instructions that will be required. For example, if the control information indicates a loop, then the control signal may inhibit at least some of the instructions from within the loop from being overwritten. This is done as the instructions in the loop will be required several times in a row and leaving them in the buffer during the execution of the loop means they do not have to be accessed from memory several times and this thereby reduces instruction movement. It may be that the loop is too large for all of the instructions to be continuously stored during its execution and in such a case an appropriate number of the longer instructions are chosen for continuous storage.

The interface also comprises a configuration signal input 26, operable to receive a configuration signal. The configuration signal input 26 is an input similar to the control signal input 25, but with signals coming from the system itself. Thus, the interface receives local knowledge from the program and data processing apparatus information pertaining to the system itself, and the system conditions under which the program interacts with the system can be input.

In the embodiment shown in FIG. 1A there is a single input bus 12 and multiple output buses 32. The input bus 12 is configured to run at 2 times the speed of the output buses, accounting for the situation that on average only two of the output busses will be active, thus on average the same amount of data can pass along the input and output interface at the same time, while the peak bandwidth offered to the data processor is 50% higher than the average.

It should be noted that the illustration shows one example configuration of the interface. The interface is configurable and can receive a variety of widths of data buses and a variety of number of buses. Furthermore the clocking speed of the input and output can also be varied.

Figure 1B:
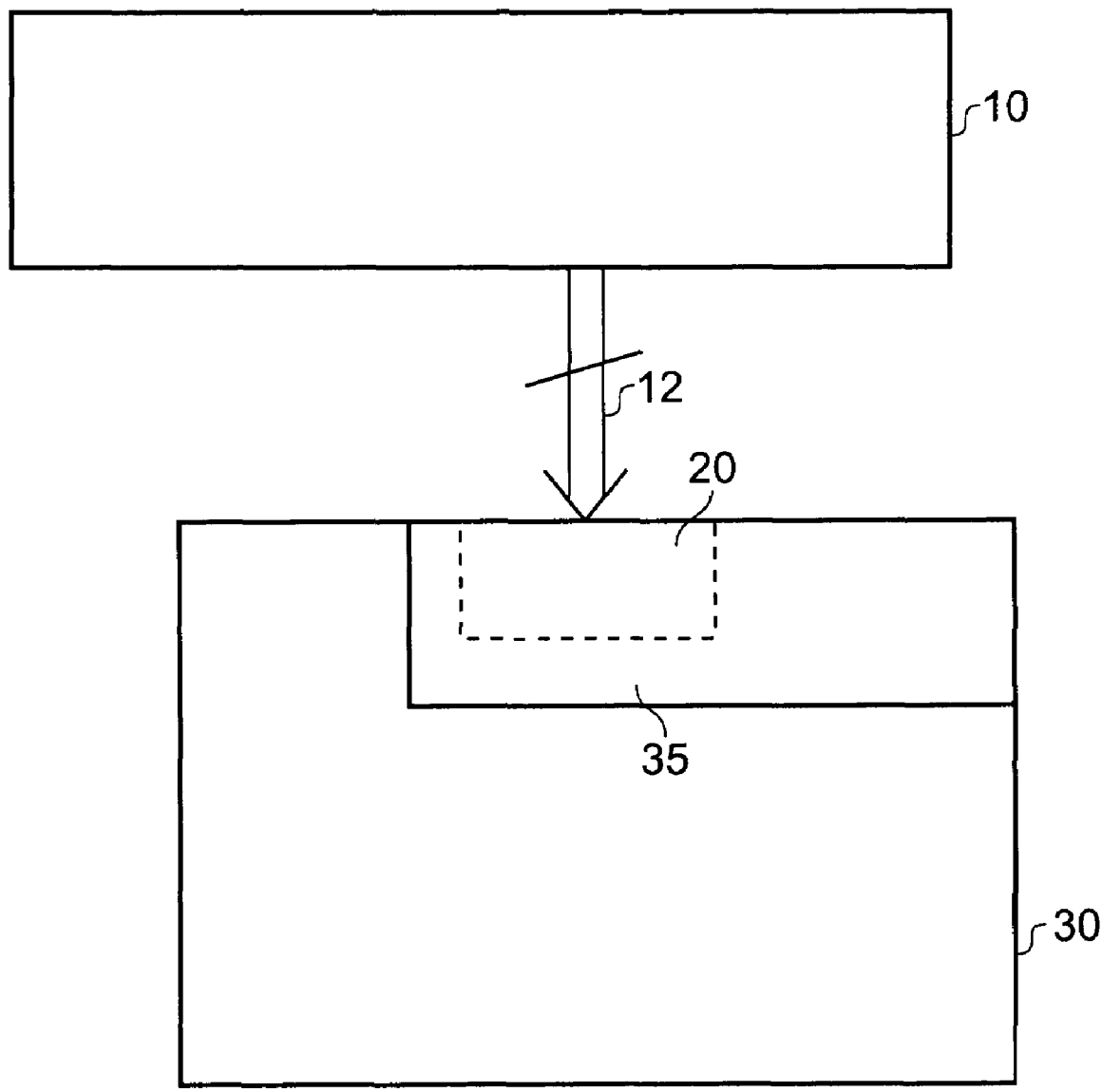

FIG. 1B shows an alternative example arrangement similar to that of FIG. 1A, but the interface 20 is formed within the data processor controller 35. This example embodiment has advantages of speed and latency over the example embodiment of FIG. 1A as there is no explicit external feedback path and some of the controller and buffer registers can be shared.

Figure 2:
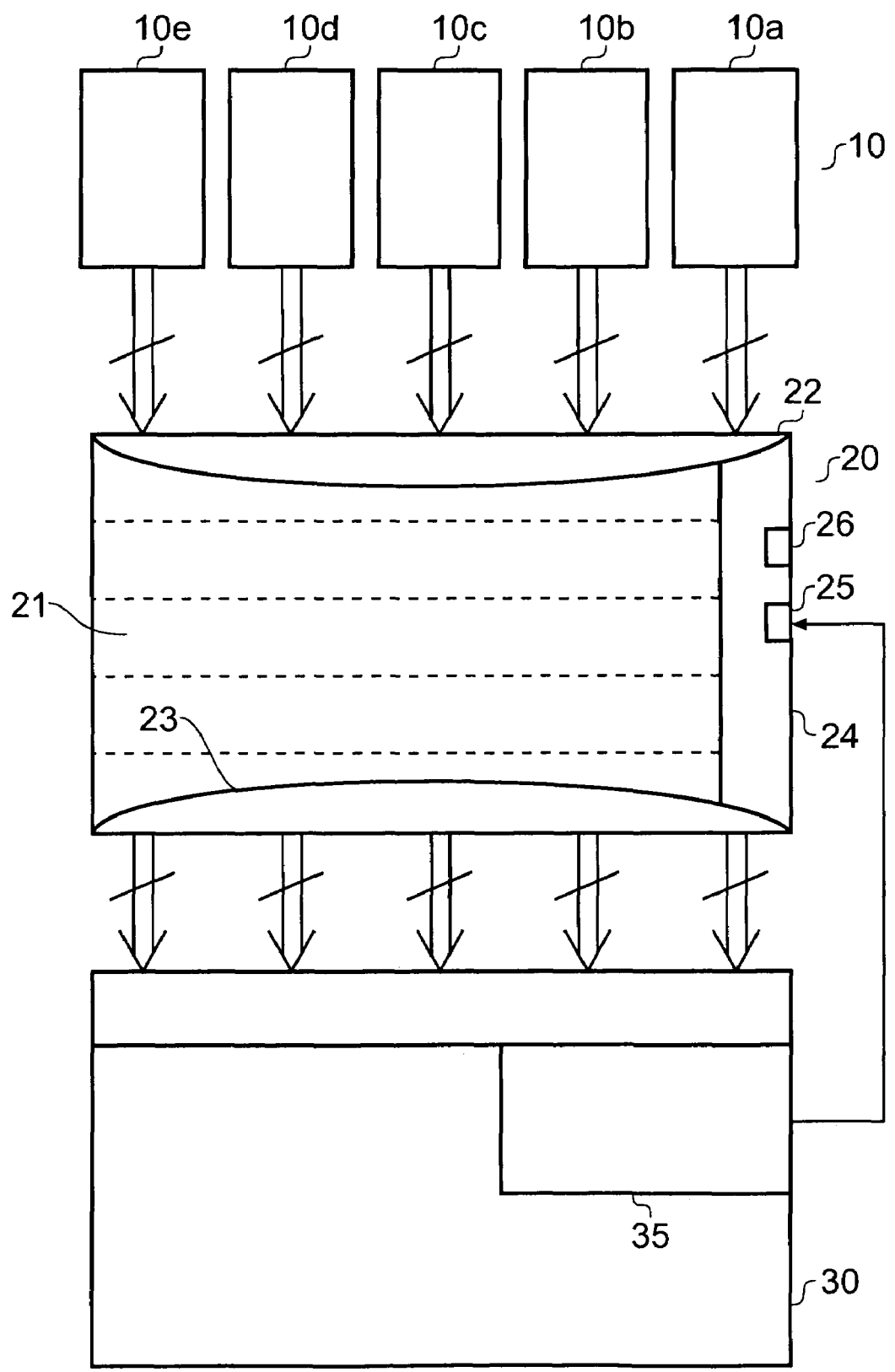
FIG. 2 schematically shows a data store connected to a data processor via an interface according to a further embodiment.

FIG. 2 shows an alternative embodiment to that shown in FIG. 1 in which data store 10 comprises a plurality of memory banks 10a to 10e. Each memory bank can store a single instruction or it can store just a portion of a longer instruction. Input logic 22 controls which bus instructions are requested from. In this embodiment the number of input buses and output buses are equal and thus, generally, the clocking speed of the inputs and outputs will be the same.

In other embodiments there may be more output buses than input buses and yet the clocking speeds of the inputs and outputs may still be the same. For example, a processor's internal word length (for a VLIW) may be say 6×32 bits. However, true VLIW instructions are very rare, and thus, an interface having 4×32 bit buses to the data processor would only very rarely generate a stall. On average the demand is only 2.5×32, although in loops the probability of needing 4×32 is high. There may only be 3×32 bit buses between the interface and the memory as these can service the average of 2.5×32, and as the interface acts as a buffer, servicing the average is what is required. Furthermore, if the buffer stores loop instructions that are required a multiple number of times, they will only be input once, but output a multiple number of times so that an input bandwidth that is lower than the output bandwidth is sufficient. For this to work correctly the interface buffer must be sufficiently deep to hold a loop, or at least a part of a loop, and to be able to buffer the difference between input rate being the average required but lower than a peak output rate.

FIG. 2 operates in much the same way as FIG. 1 with the flow of program instructions through the buffer being controlled by controller 24. This acts as an aggressive pre-fetch in most cases, but this behaviour can be overridden by control signals received at input 25. These control signals are derived from control information associated with the instructions. These control signals allow the behaviour of the interface to be proactive rather than reactive. This is because the control signals are derived from information relating to the application's future behaviour. Thus, they can use this information to control the interface to act appropriately. For example the control signals may inhibit the overwriting of loop instructions that will be needed later. This is very different to the behaviour of a normal FIFO that inputs instructions to a data processor, such a FIFO does not act proactively but rather acts reactively, responding to data flow on its input and output buses to try to maintain the buffer in a full state.

Figure 3:
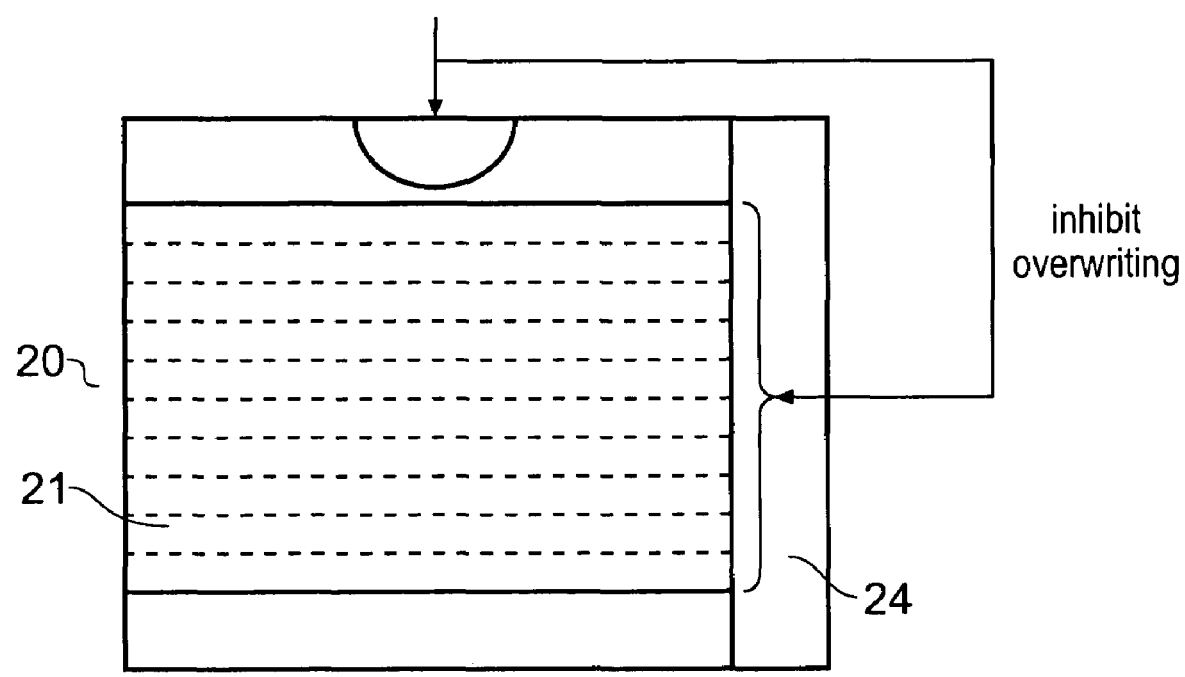
FIG. 3 schematically shows an interface storing instructions from within a program loop according to an embodiment.

FIG. 3 schematically shows the behaviour of the interface 20 responding to detection of a loop. The control information associated with the instructions indicates that the loop has ten instructions in it and a control signal to this effect is sent from the data processor to the interface 20. The buffer controller 24 knows that there are eight instruction spaces in the buffer 21 and it therefore acts in response to the control signal to control the interface to inhibit over-writing of the seven longest loop instructions within the buffer. The other instructions in the loop are fetched to the spare space in the buffer as required. This means that the longer instructions are not continually fed from memory and written to the buffer. In other embodiments it may be that the most significant portion of the loop is retained in the buffer and the instructions within it are kept in sequence, thereby reducing the complexity of the system. Alternatively, in some embodiments the system may hold only the odd instructions and read the even ones again, this has the advantage of being simpler to implement. The instructions held and those read again depend on the embodiment. The choice of which instructions to hold is generally made with the aim of averaging out bust accesses to program memory and thereby reducing stalls due to access bursts.

Figure 4:
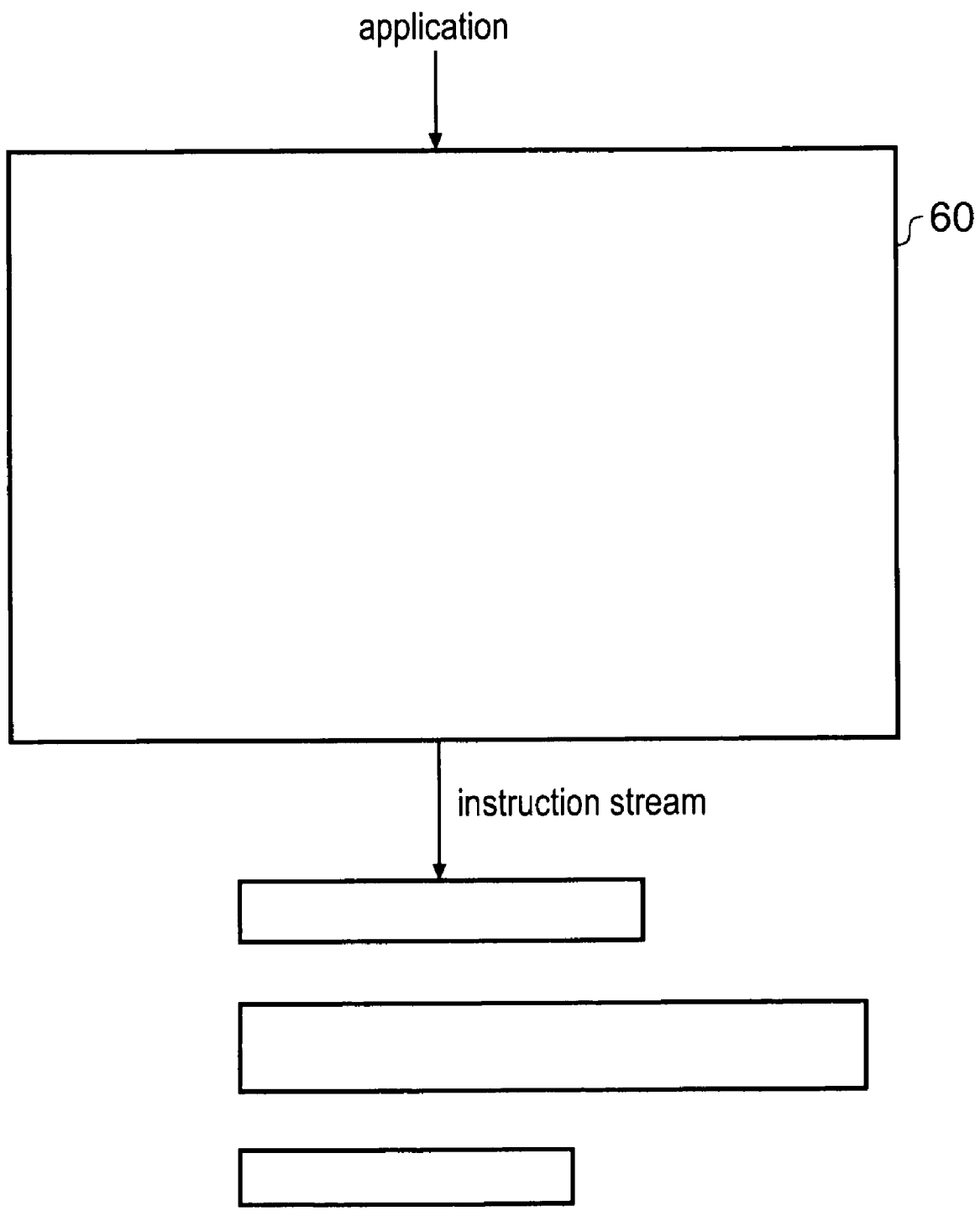
FIG. 4 schematically shows a compiler according to an embodiment.

FIG. 4 shows a compiler 60 according to an embodiment of the present invention. The compiler 60 receives an application and generates a static schedule of the application and an instruction stream of instructions to be executed. The compiler analyses the static schedule and derives control information from it. It then associates the control information with appropriate instructions to which the control information relates within the instruction stream. This control information being derived from the static schedule is able to predict which instructions are needed when. In particular, the static schedule is generally used to locate non-subsequent instructions within an instruction stream and control information is then associated with these instructions or their preceding instructions. Thus, an interface reacts to the control information to both request non-subsequent instructions when it detects they are needed, and to inhibit overwriting of instructions if it detects they are to be used more than once, thereby saving power and increasing the speed of operation of the processor.

Figure 5:
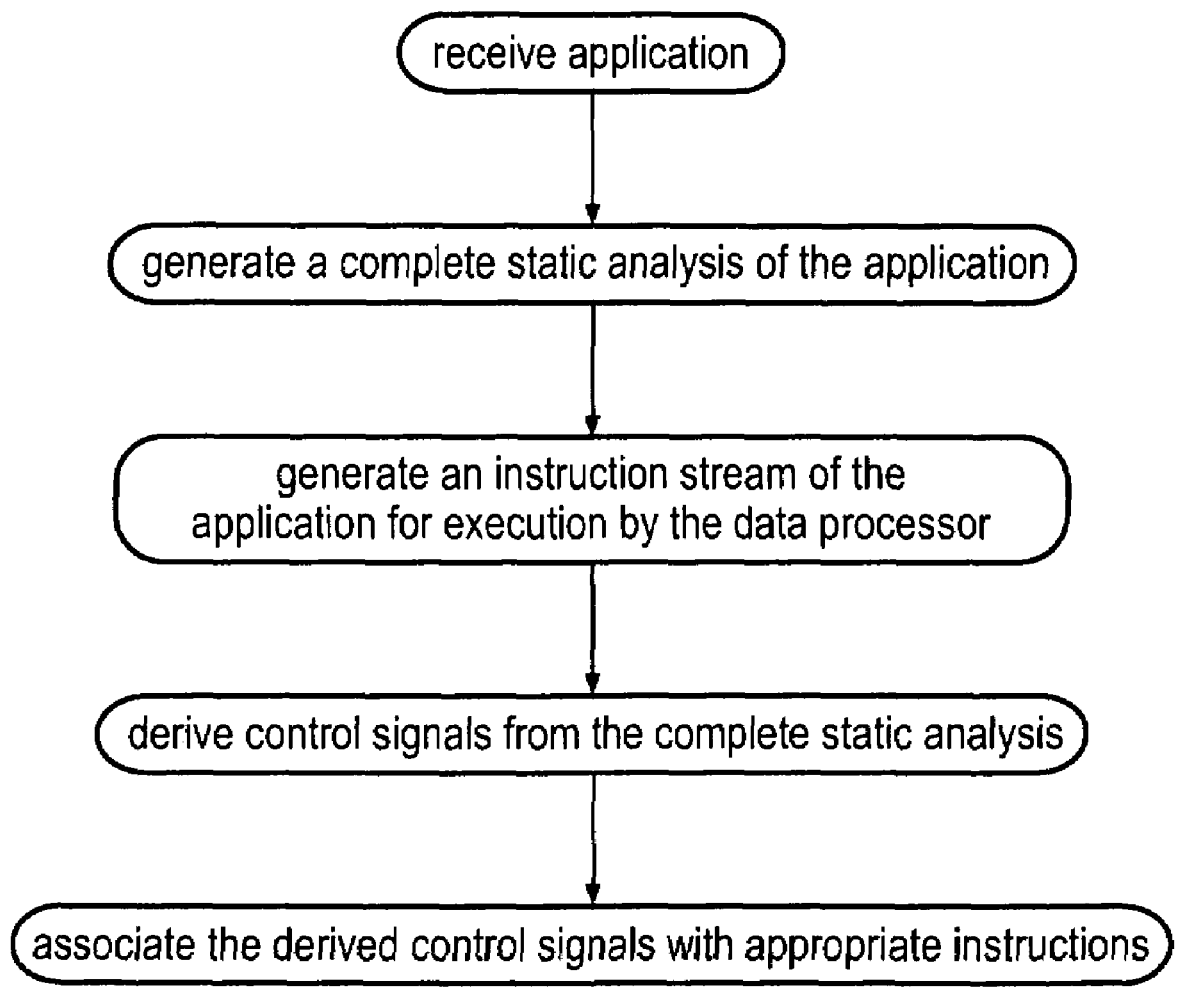
FIG. 5 shows a flow diagram giving the steps performed by the compiler of FIG. 4.

FIG. 5 shows a flow diagram indicating operation of the compiler. The compiler receives the applications and generates a complete static analysis of the application. It also produces an instruction stream for the application and it derives control signals from the static schedule. These control signals are then associated with appropriate instructions to which they relate such that when the application is executed by a data processor, the control information is sent along with the relevant instruction.

Although illustrative example embodiments have been described in detail herein with reference to the accompanying drawings, it is to be understood that these embodiments are not limiting, and that various changes and modifications can be effected therein by one skilled in the art without departing from the scope and spirit of the invention as defined by the appended claims.

We claim:

1. An interface for requesting instructions from a data store storing instructions of a program to be executed by a data processor, and for receiving and transmitting said instructions to said data processor, said interface being for use in a processing system and comprising:
    an input configured to receive said instructions from said data store via at least one input bus;
    a buffer configured to store said received instructions;
    an output configured to output said instructions to said data processor via at least one output bus;
    a control signal input configured to receive a control signal including information about program behavior of said program; and
    a buffer controller configured to:
        control said buffer to request an instruction subsequent to a previously received instruction within an instruction stream of said program from said data store in response to detection of no control signal on said control signal input and to detection of available buffer storage capacity; and
        control at least one of input of instructions and storage of instructions within said interface in order to seek to reduce instruction movement through said input in response to a control signal received at said control signal input,
    wherein said interface further includes a configuration signal input configured to receive a configuration signal, said configuration signal indicating system conditions under which said program interacts with said processing system, and
    wherein said buffer controller is responsive to both said control signal received at said control signal input and to said configuration signal received at said configuration signal input to control said at least one of input and storage of instructions within said interface in response.

2. An interface according to claim 1, wherein said data store is configured to store control information associated with at least some of said instructions, and said interface is configured to receive, store and output said associated information together with said at least some instructions.

3. An interface according to claim 1, wherein said input is configured to receive instructions from one input bus and said output is configured to output instructions to a plurality of output buses.

4. An interface according to claim 1, said interface further comprising:
    input logic configured to control which of said at least one input buses said input receives said instructions from; and
    output logic configured to control which of said at least one output buses said output outputs said instructions to.

5. An interface according to claim 4, wherein said instructions are very long instruction words in compacted form, such that not all of said instructions have the same length.

6. An interface according to claim 4, said interface further comprising:
    input logic configured to configure a clock speed for clocking receipt of said instructions; and
    output logic configured to configure a clock speed for clocking output of said instructions.

7. An interface according to claim 4, wherein said input logic is structured to configure said clock speed for clocking receipt of said instructions at a first rate and said output logic is structured to configure said clock speed for clocking output of said instructions at a second rate, said first rate being different to said second rate.

8. An interface according to claim 1, wherein at least one of said at least one input bus and said at least one output bus is of a different width to at least one other of said at least one input bus and said at least one output bus.

9. An interface according to claim 1, wherein said input is configured to receive instructions across a bandwidth that is smaller than a bandwidth that said output is configured to output instructions across.

10. An interface according to claim 1, wherein said buffer controller is responsive to said control signal indicating request of an instruction at an address remote from a previously requested address to request instructions subsequent to said remote instruction in order to replace instructions stored within said buffer with said remote instruction and instructions subsequent to said remote instruction.

11. An interface according to claim 1, wherein said buffer controller is responsive to said control signal indicating request of a subsequent instruction that is at an address close to but not adjacent to a previously requested address to request a plurality of subsequent instructions from said instruction stream up to and including said instruction at said close address.

12. An interface according to claim 1, wherein said buffer controller is responsive to said control signal indicating loops within said program to inhibit overwriting of at least some of said instructions of said program loop stored in said buffer during execution of said loop.

13. A data processing apparatus comprising:
    a data processor configured to process said program;
    an interface according to claim 1; and
    a controller configured to generate said control signal in response to control information and to transmit said control signal to said control signal input of said interface.

14. A data processing apparatus according to claim 13, wherein said data store is configured to store control information associated with at least some of said instructions, and said interface is configured to receive, store and output said associated information together with said at least some instructions; and
    said controller is configured to receive said instructions and said associated control information from said interface and to generate said control signals in dependence upon said associated control information.

15. A data processing apparatus according to claim 14, wherein said associated control information identifies loops within said program and said control signal is configured to inhibit overwriting of at least some of said instructions of said program loop stored in said buffer during execution of said loop.

16. A data processing apparatus according to claim 13, wherein said interface is formed within said controller.

17. A data processing apparatus according to claim 13, wherein said controller is further configured to output an address associated with an instruction to said buffer controller.

18. A method of controlling the transmission of instructions from a data store to a data processing apparatus via an interface, comprising:

receiving said instructions from said data store at said interface from at least one input bus;

storing said received instructions in a buffer within said interface;

outputting said instructions from said interface to said data processing apparatus via at least one output bus;

receiving at a control signal input a control signal indicating program behavior of a program comprising said instructions, and controlling at least one of input and storage of instructions within said interface in order to seek to reduce instruction movement through said interface in response to said control signal;

controlling said interface to request an instruction subsequent to a previously received instruction within an instruction stream of said program from said data store in response to detection of no control signal on said control signal input and to detection of available buffer storage capacity;

receiving a configuration signal at a configuration signal input, said configuration signal indicating a system condition under which said program interacts with the processing system; and controlling said interface to control said at least one of input of instructions and storage of instructions in response to both said control signal and said configuration signal.

\* \* \* \* \*